United States Patent [19]

Matsuhisa et al.

[11] Patent Number: 5,238,627
[45] Date of Patent: Aug. 24, 1993

[54] METHOD FOR PRODUCING CERAMICS SINTERED ARTICLE AND MOLDING METHOD AND MOLDING APPARATUS TO BE USED THEREFOR

[75] Inventors: Tadaaki Matsuhisa, Kasugai; Shigeki Kato; Hiroyuki Iwasaki, both of Nagoya, all of Japan

[73] Assignee: NGK Insulators, Ltd., Japan

[21] Appl. No.: 624,540

[22] Filed: Dec. 6, 1990

Related U.S. Application Data

[63] Continuation-in-part of Ser. No. 359,873, May 31, 1989, abandoned.

[30] Foreign Application Priority Data

Jun. 1, 1988 [JP] Japan .................. 63-134833
Dec. 24, 1988 [JP] Japan .................. 63-326933

[51] Int. Cl.$^5$ .................................... C04B 35/64
[52] U.S. Cl. ........................... 264/63; 264/328.2
[58] Field of Search ......................... 264/63, 328.2

[56] References Cited

U.S. PATENT DOCUMENTS

| | | | |
|---|---|---|---|
| 2,893,102 | 7/1959 | Maxwell et al. | 264/28 |
| 4,341,725 | 7/1982 | Weaver et al. | 264/28 |
| 4,429,051 | 1/1984 | Davidge et al. | 501/12 |
| 4,677,082 | 6/1987 | Alford et al. | 501/1 |
| 4,734,237 | 3/1988 | Fanelli et al. | 264/63 |
| 4,923,652 | 5/1990 | Murakawa et al. | 264/63 |

FOREIGN PATENT DOCUMENTS

| | | |
|---|---|---|
| 0140682 | 5/1985 | European Pat. Off. . |
| 161494 | 11/1985 | European Pat. Off. . |
| 0300681 | 1/1989 | European Pat. Off. . |
| 3942666 | 6/1990 | Fed. Rep. of Germany . |
| 1059585 | 3/1957 | France . |
| 57-146607 | 9/1981 | Japan . |
| 63-236605 | 3/1988 | Japan . |

OTHER PUBLICATIONS

Derwent Accession No. 88-016 937.
Derwent Accession No. 86-110 271.
Derwent Accession No. 86-152 980.

*Primary Examiner*—James Derrington
*Attorney, Agent, or Firm*—Parkhurst, Wendel & Rossi

[57] ABSTRACT

A ceramics shaped article having a large wall-thickness and having a complicated shape, which can not be monolithically produced by a conventional molding, can be easily produced through a monolithical molding by the use of a ceramic batch containing water as a plasticizing medium and a small amount of an organic binder as a plasticizer. The ceramic shaped article can be fired into a ceramic sintered article in high dimensional accuracy and yield.

17 Claims, 15 Drawing Sheets

FIG_1

FIG_3

FIG_4

FIG._8A
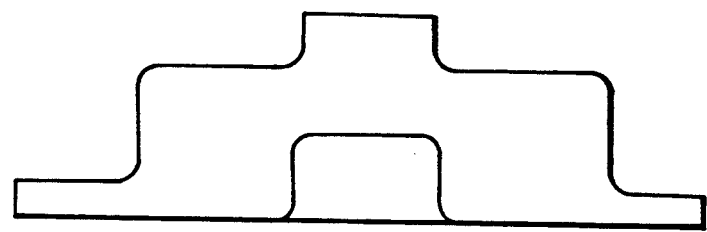
FIG._8B
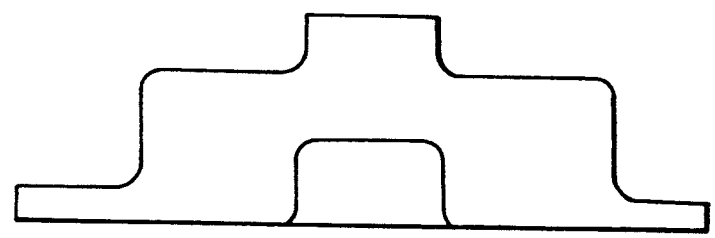
FIG._8C
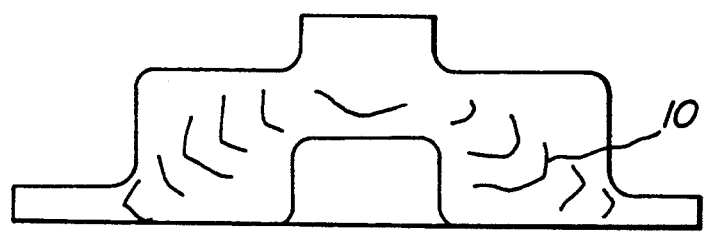
FIG._8D
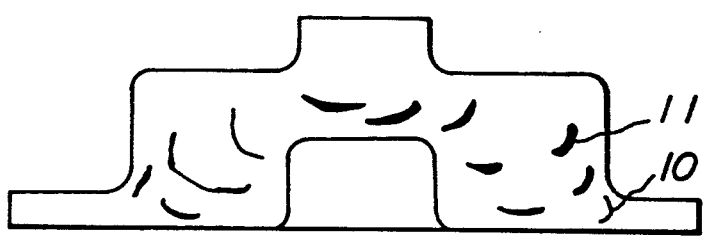

FIG_13

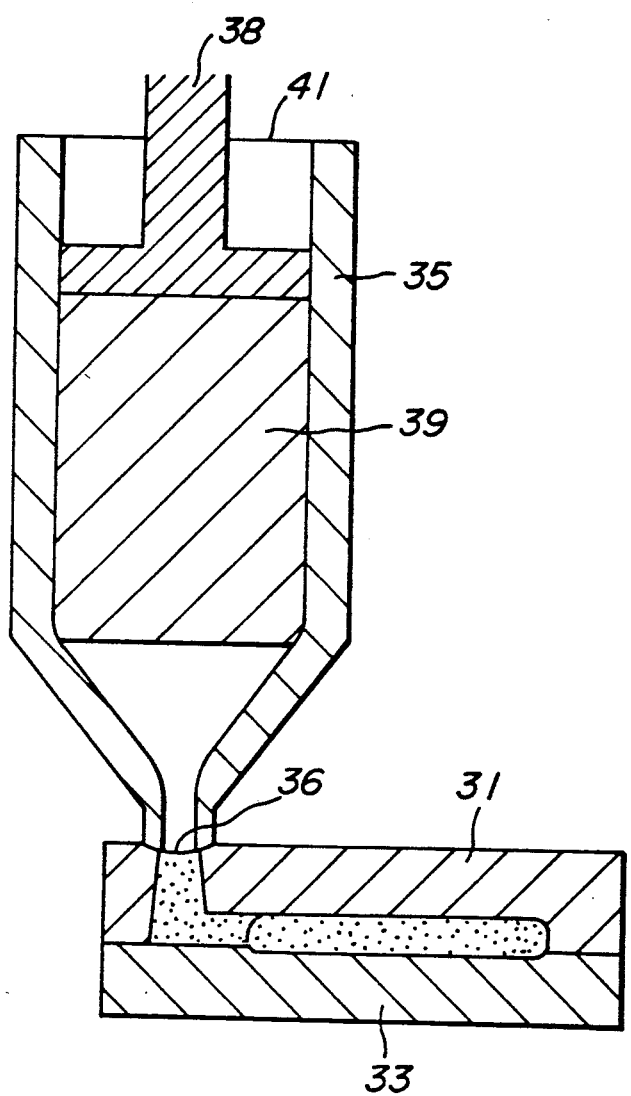
FIG_15

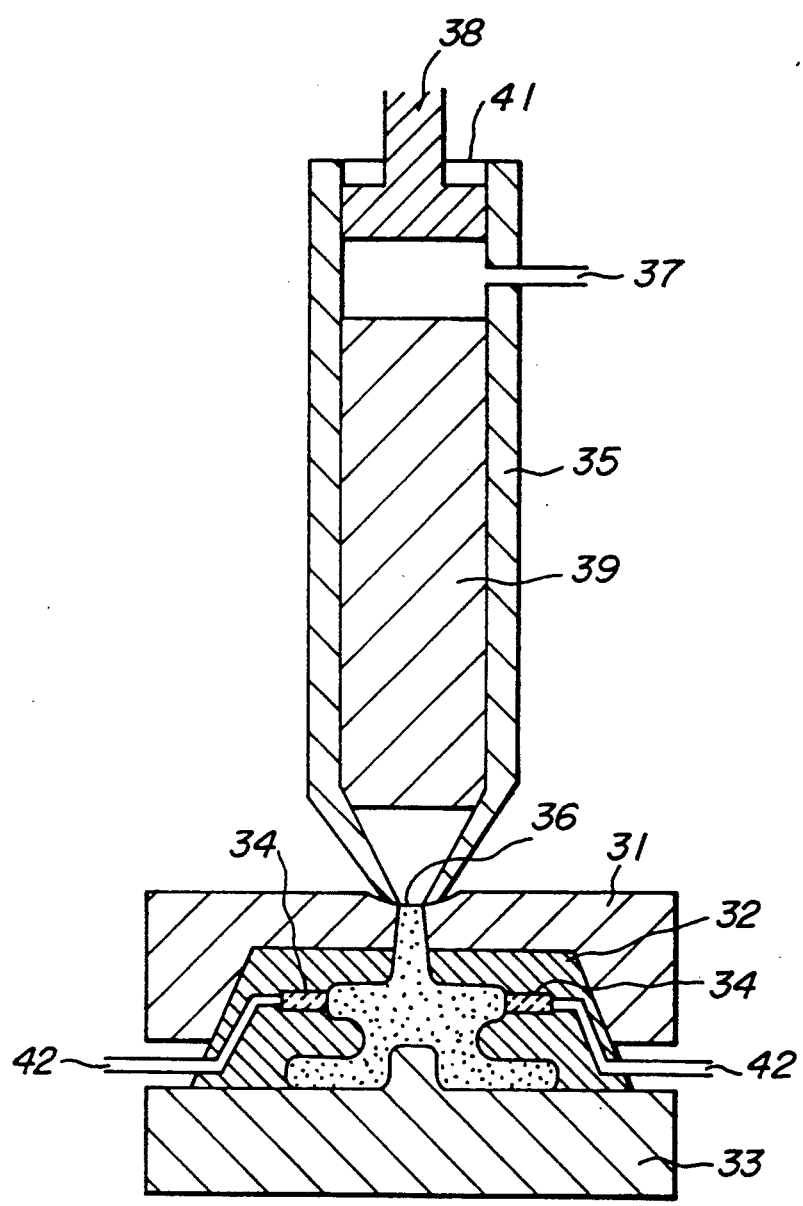
FIG_16

METHOD FOR PRODUCING CERAMICS SINTERED ARTICLE AND MOLDING METHOD AND MOLDING APPARATUS TO BE USED THEREFOR

This is a continuation-in-part of application Ser. No. 07/359,873 filed May 31, 1989, now abandoned.

BACKGROUND OF THE INVENTION

1) Field of the Invention

The present invention relates to a method for producing a ceramic sintered article from a batch material containing a plasticizing medium generally being water; and a method for molding ceramic, wherein a ceramics batch containing water and an organic binder is poured into a batch-retaining portion and held once therein, and then the batch is injected into an impermeable die under pressure, a part of the molding surface of which impermeable die is constituted with a material having a contact angle with water of at least 80 degrees; and a molding apparatus to be used in the molding method.

2) Related Art Statement

There have hitherto been known a slip casting method or injection molding method as a molding method for producing ceramic structural parts, such as a turbine wheel and the like, having a complicated shapes.

The slip casting method is a method, wherein a slurry of ceramic powder is poured into a casting die made of gypsum or the like, and solidified therein to obtain a shaped article. In the cast molding method using a gypsum die or the like, a shaped article having a complicated shape can be produced, but the shaped article often has poor dimensional accuracy due to the poor accuracy of the die. Moreover, a long molding time is generally required due to the use of a large amount of water as a plasticizing medium.

A pressure cast molding method is a method for producing a shaped article, wherein a slurry of ceramic powder is poured into a permeable casting die, the slurry is pressed to exhaust a large amount of water through the permeable casting die, and to solidify the slurry. In this method, a shaped article having a complicated shape can be produced, but the shaped article has poor retention, and it is difficult to release the shaped article from the die, and hence a long molding time is required.

The injection molding method is a method, wherein a homogeneous mixture of ceramic powder with various thermoplastic organic binders is heated, and then the mixture is injected into a die and cooled therein to obtain a shaped article. In this injection molding method, a shaped article having a complicated shape can be produced. Further, this method is adapted to the mass production of shaped articles. However, the shaped article must be heated for a long period of time of generally at least 100 hours in order to prevent the shaped article from being cracked or deformed during the removal step of organic binder, that is, during the degreasing step. Moreover, this injection molding method has been used only in the production of a shaped article having a small wall thickness.

Japanese Patent Laid-open Specification No. 61-10,405 discloses a method, wherein a slurry consisting of a mixture of fine ceramic powder, such as $Al_2O_3$, SiC, $Si_3N_4$, $ZrO_2$ or the like, water and an organic additive is subjected to an injection molding to produce a shaped article. However, in this method, a particular porous die is used, and a pressure is kept to 100–600 $kg/cm^2$ after injection, whereby water is removed from the slurry to obtain a green shaped article. Therefore, a complicated operation must be carried out in order to remove the green shaped article from the die.

The conventional compression molding method or transfer molding method carried out in the production of ceramic shaped articles is relatively simple in the operation, but has been used only in the production of small and thin-wall articles, such as chinawares and the like, and has not been used in the production of the above described structural parts, such as turbine wheels and the like, having complicated shapes.

The present invention aims to eliminate the drawbacks of the above described conventional techniques, and to decrease significantly the production steps and the production time in a method for producing a ceramic sintered article, wherein a shaped article is produced through an injection molding, transfer molding or the like, water and organic binder are removed from the shaped article, and then the shaped article is fired; and further to provide a method capable of producing monolithically a thick-wall sintered article, such as a a turbine wheel and the like, having a complicated shape illustrated in FIG. 2 through an injection molding, compression molding or transfer molding. In order to attain these objects, the inventors have made various investigations for the production of a thick-wall sintered article having a complicated shape by a method, wherein a ceramic batch containing a plasticizing medium generally being water which is not used in the conventional methods, and further containing an organic binder as a plasticizer, is formed into a shaped article having a complicated shape through an injection molding, compression molding or transfer molding, and the shaped article is fired. As a result, the inventors have reached the present invention.

SUMMARY OF THE INVENTION

The first aspect of the present invention is the provision of a method for producing a ceramic sintered article, comprising subjecting a ceramic batch, which contains a ceramics powder, a sintering aid, water and an organic binder, to an injection molding, a compression molding or a transfer molding to form a green shaped article, removing the water and the organic binder from the green shaped article, and then firing the shaped article.

The second aspect of the present invention is the provision of a method for molding a ceramic, comprising pouring a ceramic batch containing water and an organic binder into a batch-retaining portion, retaining once the batch in the batch-retaining portion, and pouring under pressure the batch into a die assembly consisting of an impermeable die or consisting of a combination of a permeable die and an impermeable die, a part of the molding surface of which impermeable die is constituted with a material having a contact angle with water of at least 80 degrees.

Further, the third aspect of the present invention is the provision of a molding apparatus for a ceramic, comprising a means for receiving and retaining a ceramics batch containing water and an organic binder, and a die assembly, into which the batch is poured under pressure from the means for retaining the ceramic batch; said die assembly consisting of an impermeable die or consisting of a combination of a permeable die and an impermeable die, a part of the molding surface of which impermeable die is constituted with a material having a contact angle with water of at least 80 degrees.

BRIEF DESCRIPTION OF THE DRAWINGS

FIGS. 8A-8D are views illustrating the properties of the cross-sections of test piece shaped articles having a complicated shape;

FIGS. 13-16 are cross-sectional views of molding apparatuses for ceramics exemplified in the examples of the present invention.

Figure 1:
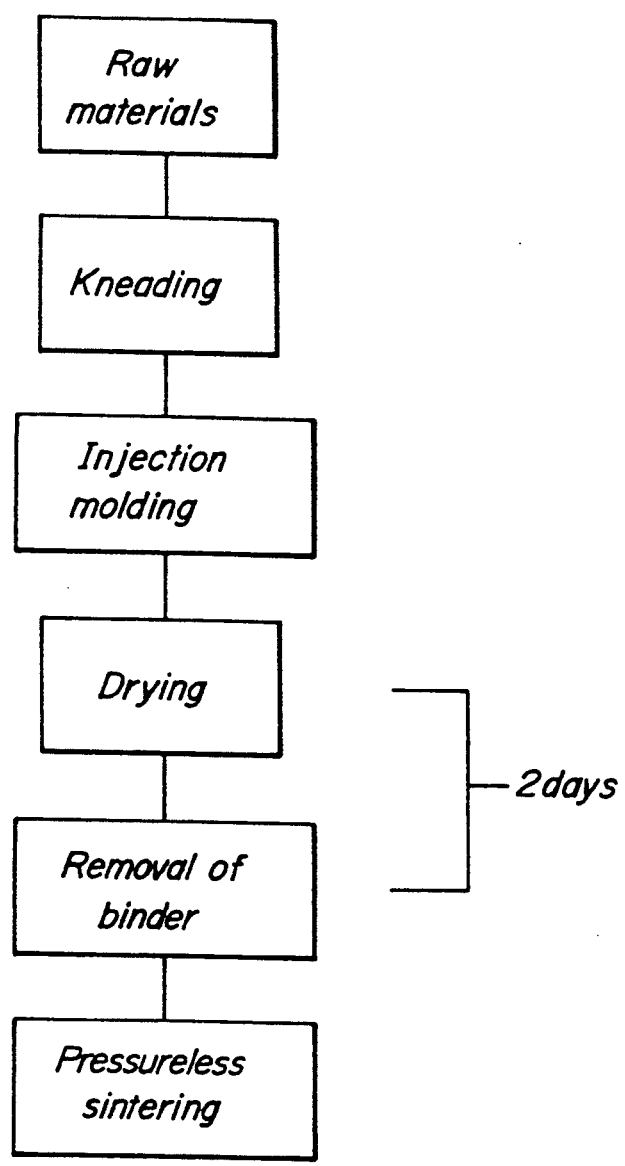
FIG. 1 is a blocked flow sheet illustrating the production steps of a ceramic sintered article of the present invention through an injection molding.

In the drawings, the following numbers represent the following 1: ceramic batch, 2: piston, 3: cylinder, 4: nozzle, 5: movable plate, 6: upper die, 7: lower die, 8: shaped article, 9: exhaust port, 10: crack, 11: pore, 12: movable plate, 13: upper die, 14: lower die, 15: clamping plate, 16: piston, 17: cylinder, 18: movable plate, 19: upper die, 20: lower die, 21: shaped article, 31: impermeable die, 32: impermeable slide core, 33: impermeable die, 34: permeable die, 35: batch-retaining portion, 36: inlet, 37: exhaust port, 38: pressure piston, 39: ceramic batch, 40: blade portion, 41: inlet of batch-retaining portion, and 42: exhaust port.

DESCRIPTION OF THE PREFERRED EMBODIMENTS

The present invention will be explained mainly with respect to the case, wherein the injection molding is used. In the present invention, the compression molding or transfer molding can be carried out in fundamentally the same manner as the injection molding.

That is, in the present invention, a ceramic powder containing a sintering aid is mixed with water as a plasticizing medium and an organic binder as a plasticizer to produce a batch having good moldability and shape retention. The resulting batch is injection molded to produce a shaped article having a high dimensional accuracy in a high yield in releasing from the die. Then, the water and the organic binder are removed from the green shaped article, and then the shaped article is fired, whereby a sintered article can be obtained in a short time in the present invention. The sintered article aimed in the present invention, generally has a complicated shape and a large thickness and is required to have high strength and a high reliability. For example, the sintered article is a structural ceramic part, such as ceramic gas turbine wheel or the like, and when a sintered article has a defect, such as very small gap, void or the like formed therein, the sintered article is no longer commercially valuable. Therefore, the above described batch to be used in the present invention must have such properties that (1) the batch is produced by means of a vacuum-kneading machine or the like so as not to contain bubbles, which cause the defects in the resulting sintered article, (2) the batch has a high shape retention and hence can give a shape retention to the resulting shaped article without removing water during the molding, (3) the batch has a high fluidity and hence does not generate defects, such as weld line and the like, during the molding, and the like. Clay and the like, which are used in the conventional ceramics and the like, are not included in the batch to be used in the present invention.

The batch to be used in the present invention contains a proper amount of water which is generally used as a plasticizing medium, and a proper amount of an organic binder used as a plasticizer.

Figure 2:
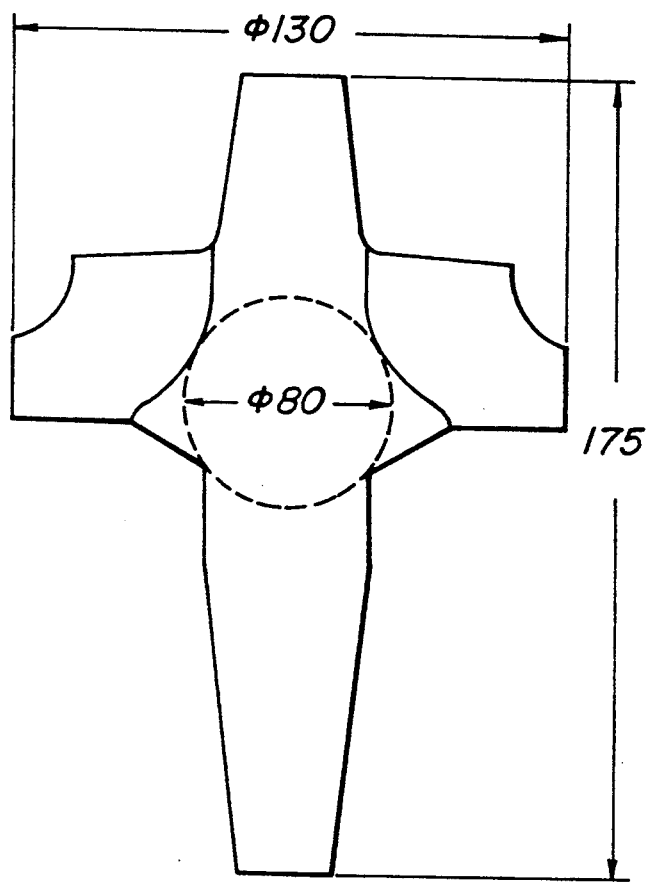
FIG. 2 is a cross-sectional view of a turbine wheel shaped article.

The use of a proper amount of water has such merits that (1) water can be easily removed without causing defects in the resulting shaped article within a short period of time in the removing step of water due to the reason that water does not thermally decompose and further has a low thermal expansion coefficient, (2) a binder can be easily removed in a short period of time by a rapid heating in the after-treatment step based on the reason that a porous shaped article is formed due to the removal of water from the shaped article, (3) the binder can be easily removed from a thick shaped article, for example, a turbine wheel illustrated in FIG. 2, due to the same reason as described in the above item (2), and the like.

The use of a proper amount of an organic binder has such merits that, when an organic binder, for example, a thermally gelatinizable and curable organic binder is used, a high strength can be further given to the shaped article by thermal gelatinization and curing of the batch during the molding, and the shape retention of the shaped article can be increased.

The above described effect of the use of proper amounts of water and organic binder is a remarkably excellent effect obtained by use of the batch of the present invention. The removal of water, that is, drying, can be carried out in an ordinarily used constant temperature-constant humidity chamber or the like, and the removal of the binder can be carried out in an ordinarily used oxidizing atmosphere furnace (calcination furnace) or the like.

In the injection molding method using the batch of the present invention, the binder can be removed (degreased) in a time shorter than the time required in the removal of binder in a conventional injection molding which uses a large amount of an organic plasticizer, and moreover a shaped article can obtained in a molding time shorter than the molding time required in a cast molding method or pressure cast molding method, which uses a large amount of water. When a compression molding method or transfer molding method is carried out by using the above described batch of the present invention, a structural ceramic having a complicated shape and a large thickness, which has not hitherto been obtained by the conventional compression molding method or conventional transfer molding method, can be obtained.

As the method and apparatus for evaluating the fluidity of the batch, a rheometer is generally used, but a flow tester or melt indexer used in a conventional injection molding can be used as well.

The ceramic powder to be used in the present invention includes any of non-oxide ceramic materials, such as carbides and nitrides, for example, silicon carbide, silicon nitride, sialon, boron nitride and the like, and oxide ceramic materials, such as zirconia and the like.

The ceramic material can be used alone or in admixture of at least two members depending upon the use purpose of the resulting shaped article. When the aimed shaped article is a structural ceramic part or the like, which is required to have high temperature resistance and high mechanical strength, a ceramic material consisting mainly of silicon nitride is preferably used.

In the ceramic powder to be used in the present invention, it is preferable to satisfy such conditions that (1) the ceramic powder can be homogeneously mixed with water and an organic binder and can be formed into a homogeneous batch having high moldability and shape retention through a vacuum-kneading, (2) the ceramic powder is low in slip resistance between fellow particles, is excellent in fluidity and does not cause defects, such as flow mark and the like, in the resulting shaped article, (3) defects are not formed during drying of the resulting shaped article and removal of the binder, and the strength of the resulting shaped article is not decreased, and the like. As the ceramic powder which satisfies these conditions, a powder whose particle size satisfies the following equation (a) is preferably used.

$$\frac{\text{average particle size calculated from the particle size distribtuion}}{\text{specific surface area particle size calculated by the adsorption method}} \leq 5 \quad \text{(a)}$$

In the present invention, the average particle size calculated from the particle size distribution in the above described equation (a) is an average particle size calculated from the particle size distribution by a laser diffraction system measured by means of a microtrack 7995-30 type particle size distribution measuring apparatus made by Leeds and Northrup Co. The specific surface area particle size calculated by the adsorption method in the above described equation (a) is a specific surface area particle size obtained by a calculation by the following equation (b) from the specific surface area, which is measured by means of, for example, a Flowsorb 2300 type made by Shimadzu Corporation according to the BET adsorption method. In this case, the density is inherent to the ceramic powder used. For example, the density of silicon nitride ($Si_3N_4$) is 3.18.

$$\text{specific surface area particle size by adsorption method} = \frac{6}{\text{density} \cdot \text{specific surface area}} \quad \text{(b)}$$

The batch obtained from the ceramic powder having a ratio of 5 or less of average particle size calculated from the particle size distribution to specific surface area particle size calculated by the adsorption method in the above described equation (a) is excellent in the moldability and is free from the generation of defects in the resulting shaped article and further is free form the defects in the resulting sintered article. While, when the ratio is more than 5, the batch is poor in fluidity, and the resulting shaped article has a flow mark formed during the molding, and further has pores and cracks formed therein.

In the present invention, a part of the molding surface of an impermeable die of the die assembly to be poured with a ceramic batch is made of a material having a contact angle with water of at least 80 degrees. That is, in a die assembly consisting of an impermeable die or consisting of a combination of a permeable die and an impermeable die, a part of the molding surface of the impermeable die is formed of a material, such as a fluororesin, for example, polytetrafluoroethylene, or the like, having a contact angle with water of at least 80 degrees, preferably at least 85 degrees, more preferably at least 90 degrees, whereby a shaped article having an improved mold release property is obtained.

When a material having a contact angle with water of smaller than 80 degrees is used, the resulting shaped article is poor in mold release property. Particularly, when it is intended to produce a shaped article, such as a ceramic turbine rotor or the like, having a complicated shape, a material having a contact angle with water of at least 90 degrees is preferably used due to the reason that the use of a material having a contact angle with water of at least 90 degrees results in a shaped article free from damage due to mold release.

As the material having a contact angle with water of at least 80 degrees, which constitutes a part of the molding surface of the impermeable die, there can be used fluororesins, such as polytetrafluoroethylene, polyvinyl fluoride, polyvinylidene fluoride, polytrifluorochloroethylene, tetrafluoroethyleneperfluoroalkyl vinyl ether copolymer and the like, and further polypropylene, various waxes and the like.

As the means for constituting a part of the molding surface of an impermeable die by the above described material, the following means can be used. That is, although an impermeable die itself may be produced by these materials, it is preferable from the economical viewpoint to cover the molding surface of an impermeable die with these materials. When fluororesin and the like are used as the above described material, an impermeable die made of metal can be easily and directly coated with the fluororesin and the like.

As the permeable die to be used in the present invention, commonly known permeable dies can be used. It is necessary that the permeable die has a good air permeability in order that air is effectively removed from the batch during the molding and further can secure the strength of the die itself. As the permeable die, a die having an average hole diameter of 0.1–50 $\mu$m is generally used, and further a die having a two-layered structure having different average hole diameters, which consists of a combination of a molding surface layer having an average hole diameter of 0.1–50 $\mu$m and a lower part layer having a large average hole diameter of about 50–500 $\mu$m, can be used as well. The material of the permeable die is not limited, and gypsum having a good water absorbing property, and further resin, ceramic, metal and their composite materials can be used in the permeable die.

As the impermeable die to be used in the present invention, commonly used impermeable dies can be used, and for example, metal dies and further synthetic resin dies and rubber dies can be used.

The sintering aid to be used in the present invention includes oxides, such as alumina, magnesia, beryllia, cerium oxide, strontium oxide, titania, zirconia, yttria and other rare earth oxides composite oxides, such as beryllium titanate, lead titanate zirconate and the like; multi-component oxides, such as mullite, aluminum zirconium titanate, aluminum zircon and the like; and the like. The sintering aid is preferred to have the same particle shape as that of the ceramic powder.

In the present invention, the amount of water or the like to be mixed as a plasticizing medium with a ceramics powder is 10-50 parts by weight based on 100 parts by weight of the ceramics powder to be contained in a batch to be molded into a shaped article. When the amount of water or the like is less than 10 parts by weight, the resulting mixture is poor in the kneading ability and a homogeneous batch can not be obtained. When the amount of water exceeds 50 parts by weight, a slurry like batch is formed, and a dehydration treatment is necessary during the molding. Therefore, the use of less than 10 parts by weight or more than 50 parts by weight of water or the like is not preferable.

The organic binder to be used in the present invention includes water-soluble or water-absorbing organic compounds, for example, water-soluble cellulose ether derivatives, such as methyl cellulose, hydroxypropyl methyl cellulose and the like; water-soluble polymers, such as polyvinyl alcohol, polyethylene glycol and the like; and water-absorbing polymers consisting of the derivatives of these water-soluble cellulose ether derivatives and water-soluble polymers. Preferable organic binders are polymers at least capable of being thermally gelated and cured (The term "thermally gelated and cured" means a phenomenon, for example, described in a preprint "As to extrusion molding of new ceramics by using methyl cellulose" in the "New ceramics adhesion technique lecture meeting" held in Feb. in 1984). The preferable organic binders include, for example, methyl cellulose, hydroxypropyl methyl cellulose, alkyleneoxide cellulose derivatives and the like. The organic binder acts to improve the water retention of the batch to be used in the present invention and further to maintain the plasticity of the batch. When a polymer capable of being thermally gelated and cured is used as an organic binder in a batch of the present invention, the batch is thermally gelated and cured during the molding, and the resulting shaped article has an improved shape retention and an improved mold release property.

The amount of the organic binder to be contained in the batch to be used in the present invention is preferably 0.1-15 parts by weight based on 100 parts by weight of the ceramic powder contained with batch. When the amount of the organic binder is less than 0.1 part by weight, the resulting shaped article has low strength and poor shape retention. When the amount the organic binder exceeds 15 parts by weight, a long time is required in the removal of the binder from the resulting shaped article, and further, cracks are apt to be formed in the shaped article.

The batch to be used in the present invention may contain surfactant and the like in addition to the above described ceramic powder, sintering aid, plasticizing medium and organic binder.

In the present invention, the above described ceramic powder, sintering aid, water and organic binder are formulated, the resulting mixture is kneaded, and the homogeneous mixture is deaerated by a vacuum kneading to produce a batch. In the production of the batch, all the components may be mixed together at a time, but it is preferable to mix first a ceramic powder with a sintering aid. In this case, although the pulverized particle of the ceramic powder may be mixed with the pulverized particle of the sintering aid, it is preferable to pulverize a mixture of the ceramic powder and the sintering aid into a particle size to be used in the present invention. The pulverization and mixing can be carried out by the use of pebbles formed of silicon nitride or the like, in an aqueous medium by means of Attritor.

The pulverized mixture of the ceramic powder and sintering aid is then dried. Iron in the mixture may be occasionally removed before the drying. Removal of iron can be effected by using, for example, a wet type electromagnetic filter or the like. The drying is preferably carried out by spray drying by means of a spray dryer. The treatment by the spray drier has such a merit that the drying and granulation can be concurrently effected, and organic binder an be easily removed in the later step. After drying, the pulverized mixture can be occasionally made into a uniform particle size by means of a vibrating sieve.

The above described dried pulverized mixture is kneaded together with water and an organic binder, and the kneaded mixture is deaerated generally under vacuum by mans of a vacuum kneading machine to produce, for example, a cylindrical batch.

In the vacuum kneading step, any vacuum degree can be used in so far as the vacuum kneading system is kept to a reduced pressure. However, a vacuum degree of not lower than 60 cmHg is generally used. When the vacuum kneading system is kept to a reduced pressure, water is diffused violently to form rapidly a water film on the ceramic particles, whereby a homogeneous batch can be obtained. In the production of a product, such as a ceramic turbine wheel, which is demanded to have a high strength, the vacuum degree is preferably not less than 70 cmHg, because air bubbles contained in the batch often cause breakage of the product.

As the kneading machine (extruder) to be used for the production of the batch material, there can be used, for example, pugmill, vacuum pugmill, auger machine, piston-type extruder and the like, and combination of these machine.

In order to produce a homogeneous batch having no defects, it is necessary to select properly the structures of auger screw, spacer, nozzle and the like, the extrusion speed, the temperature of batch, and other conditions.

When a vacuum kneading machine is used, a homogeneous batch is generally obtained. However, when it is difficult to produce a homogeneous batch by the use of the vacuum kneading machine, the batch may be further subjected to a hydrostatic pressure isostatic pressing by means of a rubber press machine to deaerate the batch and to produce a homogeneous batch. The batch obtained by the above described treatments can be directly used in the molding in present invention, or the batch may be once stored in a dark and cold place and then used in molding in the present invention.

In the second aspect of the present invention, a ceramic batch containing water and an organic binder is once poured into the batch-retaining portion and held therein. The vacuum kneading step is separated from the molding step, whereby the molding conditions, such as molding pressure, pouring speed and the like, can be easily set depending upon the aimed shaped article, and moreover a homogeneous batch having a uniform temperature distribution can be produced, and a shaped article having no molding defects can be obtained. Furthermore, a material having a contact angle with water of at least 80 degrees is used in that portion of the batch-retaining portion which is contacted with the batch, whereby the friction between the batch-retaining portion and the batch can be made low, and the pressure loss and the frictional heat can be decreased. Therefore, the use of a material having a contact angle with water of at least 80 degrees in the contacting portion of the batch-retaining portion with batch is preferable.

As the batch-retaining portion (that is, receiving and retaining means), a plunger type extruder is preferably used. Further, other ordinary cylinder-type extenders and the like can be used as well.

The dimension of the inlet for the batch of the batch-retaining portion to the die must be set depending upon the shape, volume and the like of the aimed shaped article, and a larger inlet is more preferable in order to decrease the friction between the batch-retaining portion and the batch.

The pressure for pouring a ceramic batch into the die is preferably at least 5 kg/cm$^2$, more preferably at least 10 kg/cm$^2$. When the pressure is lower than 5 kg/cm$^2$, the batch can not be filled in the die, and the resulting shaped article has a low density and hence is easily deformed.

It is preferable that the ratio (pouring speed/surface area of shaped article) of the pouring speed (cm$^3$/sec) of a ceramic batch under pressure into the die to the surface area (cm$^2$) of the resulting shaped article is within the range from 0.7 to 10. When the ratio is less than 0.7, defects, such as cracks, creases and the like, are apt to be formed on the surface of the resulting shaped article. While, even when the above described ratio is higher than 10, the molding can be carried out, but a large size molding apparatus is required, and hence the operability is poor, and an expense more than the necessary expense is required, and hence the use of the above described ratio of more than 10 is not economical.

The term "injection molding" (for example, vertical or horizontal plunger-type or inline screw-type injection die is used) to be used in the present invention means a molding, wherein a batch is poured into a die, such as a metal die, closed through an injection molding nozzle or the like, that is, poured into the injection-introducing portion of a die and into a die having the shape of a shaped article, which injection-introducing portion consists of an injection sprue, an injection runner and an injection gate or consists of injection sprue and an injection gate (direct gate). Any commonly known injection molding nozzle can be used. The shape of the injection-introducing portion is not particularly limited, but an injection-introducing portion, wherein the injection sprue of direct gate or the injection runner is tapered towards the injection gate in a certain angle, is preferably used. The tapered angle is generally 2-10 degrees with respect to the axis of the injection sprue of direct gate or to the axis of the injection runner.

The molding condition in the injection molding is properly selected depending upon the kinds of batch, extruder, die and the like. In the present invention, the injection molding is generally carried out under a condition of a pressure of 5–1,000 kg/cm$^2$, a pressing 50–1,000 cc/sec. The batch temperature is generally 5°–20° C.

The compression molding and transfer molding is carried out by the use of a commonly known molding apparatus, which uses a die having a shape corresponding to the aimed shaped article, depending upon the purpose. In these methods, a batch having a proper shape is generally arranged in a die or in a cylinder, and the batch is compressed by means of an upper die or piston to deform the batch along the shape of the aimed shaped article and to form the aimed shaped article by utilizing the plasticity of the batch.

The batch poured into a die having a shape of a shaped article is molded into a shaped article in the die. In this case, when a batch containing a thermally gelatinizable and curable organic binder is used, the batch is thermally gelated and cured by the action of the organic binder contained in the batch. When a die has been previously heated to a temperature near the thermally gelating and curing temperature of the organic binder, at which the organic binder is thermally gelated and cured, a shaped article having a high shape retention can be obtained. Therefore, and the shaped article can be released from the die in a short period of time, and further the shaped article has improved strength due to the thermal gelation and curing of the organic binder, and hence the shaped article has a high dimensional accuracy, and can be easily handled. Therefore, a shaped article can be produced in a high yield in the molding. In this case, the condition and the like of the die, for example, of the metal die, is properly selected depending upon the kind and addition amount of an organic binder, pouring temperature of the batch and the water content in the batch, and the shape and dimension of the aimed shaped article. In general, the die temperature is set to a temperature within the range between the temperature, which is 10° C. lower than the thermal gelatinization and curing temperature of a thermally gelatinizable and curable organic binder, and the temperature, which is 25° C. higher than the thermal gelatinization and curing temperature of the organic binder. For example, in the case where methyl cellulose is used as an organic binder, when a die is previously heated, in general, to about 45°–75° C., the batch can be thermally gelated and cured. It is desirable that a thermally gelatinizable and curable organic binder is used in the production of a product having a complicated shape, such as a turbine wheel and the like. It is not always necessary that a thermally gelatinizable and curable organic binder is used in the production of a shaped article having a simple shape.

After injection molding, compression molding or transfer molding, the green shaped article is dried and calcined, and after water and organic binder are removed from the calcined shaped article, the calcined shaped article is fired to obtain an aimed sintered article.

The drying is carried out by moisture conditioning drying, induction drying, electric current drying, induction heating drying and the like, and is generally carried out by the moisture conditioning drying by means of a constant temperature-constant humidity drying apparatus. The drying temperature is varied depending upon the size and the like of the shaped article, but is generally 40°–100° C. The drying is carried out until the humidity of the shaped article becomes about 10%. The injection molded and dried shaped article may be subjected to a hydrostatic pressure isostatic pressing before removing the organic binder. Hydrostatic pressures in the range of 1~10 ton/cm², preferably 2.5~8 ton/cm², are used in this step. After drying, the organic binder is removed from the shaped article. The removal of the organic binder, although the removal condition is varied depending upon the kind of the shaped article, is generally carried out by heating the dried shaped article at a heating rate of 10° C./hr-100° C./hr up to about 500° C. and keeping the heated shaped article at about 500° C. for 1~10 hours. In this heating, the organic binder is burnt and removed. The shaped article is generally burnt by open flame, but may be burnt under a state that the shaped article is embedded in $Al_2O_3$ powder. After the removal of the binder, the shaped article may be subjected to a hydrostatic pressure isostatic pressing.

After the removal of the binder, the shaped article is fired to obtain a sintered article. The firing condition is properly determined depending upon the kind of ceramics, the use purpose of the sintered article, and the like. For example, when a silicon nitride sintered article is produced, it is preferable that the shaped article is fired under a nitrogen gas atmosphere at a temperature of 1,600°-1,800° C. in the case of pressureless sintering or at a temperature of 1,700°-2,000° C. in the case of pressure sintering. When a silicon carbide sintered article is produced, it is preferable that a shaped article is subjected to a pressureless sintering under an argon atmosphere kept at 1,900°-2,000° C. Further, when a partially stabilized zirconia sintered article is produced, it is preferable that a shaped article is fired under an air atmosphere kept to 1,300°-1,500° C. under an atmosphere pressure.

The following examples are given for the purpose of illustration of this invention and are not intended as limitations thereof.

The batches to be used in Examples 1-3 and Comparative example 1 were produced in the following manner.

Preparation of Pulverized Mixture

A mixture of 100 parts by weight of silicon nitride, 2 parts by weight of strontium oxide, 3 parts by weight of magnesia and 3 parts of cerium oxide was pulverized in wet state by means of Attritor. The pulverized mixture had an average particle size of 0.6 μm and a specific surface area of 6.3 m²/g. In this case, the value of the above described equation (a) was 2.0 assuming that the density of the silicon nitride was 3.18. After pulverization, iron was removed form the pulverized mixture by means of a wet-system electromagnetic filter and the thus treated pulverized mixture was dehydrated and dried by means of a spray drier.

Preparation of Batches

A mixture of 100 parts by weight of the above obtained dried pulverized mixture, 7 parts by weight of methyl cellulose (trade mark: SM-4000), 1 part by weight of a surfactant (trademark: Sedran FF-200) and 30 parts by weight of water was kneaded by means of an open kneader while cooling the mixture. Then, the homogeneous mixture was vacuum-kneaded under a vacuum degree of not lower than 70 cmHg by means of a vacuum kneading machine and then extruded therefrom, which kneading and extrusion were repeated 3 times, to obtain a cylindrical batch having a diameter of 52 mm and a length of 500 mm. The resulting batch was further pressed under a pressure of 2.5 t/cm² by means of a rubber pressing machine to obtain a homogeneous batch A.

In the same manner as described above, batches B, C and D were produced by using each of pulverized mixtures of ceramics power, which pulverized mixtures had average particle sizes of 0.86, 0.75 and 0.95 μm, had specific surface area of 9.4, 13.3 and 16.8 m²/g, and values calculated by the above described equation (1) of 4.3, 5.3 and 8.5, respectively, according to the above described method.

EXAMPLE 1

Injection Molding

The above described batch A was stored for 24 hours in a refrigerator kept at 12° C., and then subjected to an injection molding.

Figure 3:
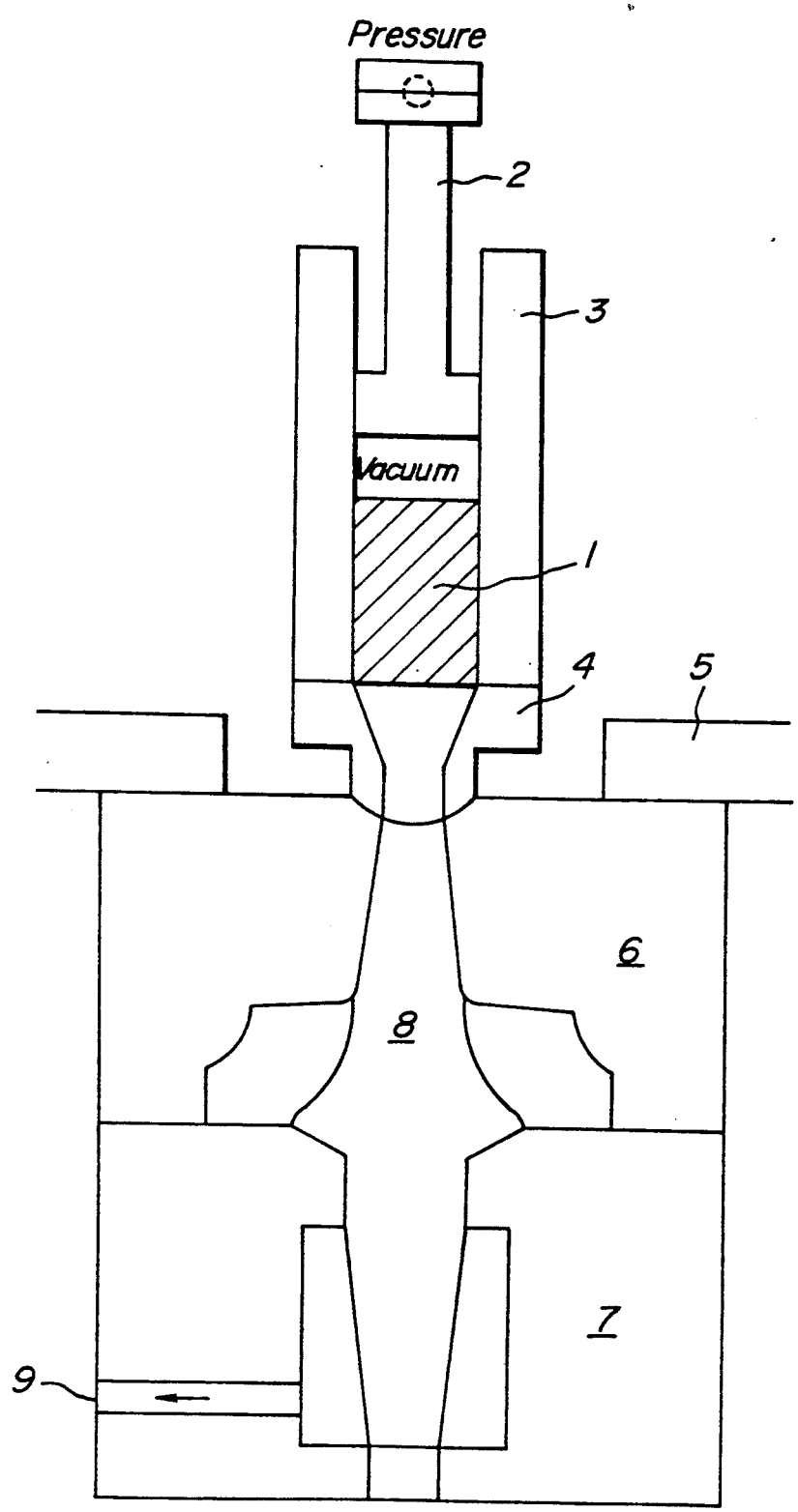
FIG. 3 is a diagrammatical cross-sectional view of an injection molding system.

(1) Turbine wheel sintered article:

A turbine wheel sintered article illustrated in FIG. 2 and having a diameter of 130 mm was produced according to the blocked flow sheet illustrated in FIG. 1. An intermediate shaped article was produced monolithically through an injection molding according to a molding system illustrated diagrammatically in FIG. 3. The die assembly used in this example had a Teflon coating formed on the inside of both the upper and lower dies 6 and 7, which coating had a thickness of 20 μm and had a contact angle with water of 105 degrees. The batch was molded under a condition that the batch temperature was 12° C., the temperature of the die was 60° C., pressure was 300 kg/cm², the pressing time was 10 seconds and the injection speed was 300 cc/sec. After the molding, the resulting mass was left to stand for 3 minutes in the die in order to thermally gelate and cure the batch.

After the injection molding, the resulting green shaped article was taken out from the die and then dried. In the drying, the shaped article was kept at 60° C. for 2 hours in a constant temperature-constant humidity chamber kept at 60° C., then heated up to 100° C. at a heating rate of 10° C./hr, and then kept at 100° C. for 3 hours. The humidity in the constant temperature-constant humidity chamber was originally 98%, but the humidity was decreased at a rate of about 10%/hr and was finally decreased to 20%.

After the drying, the organic binder was removed. In the removal of the binder, the dried shaped article was heated in air up to 500° C. at a heating rate of 50° C./hr and kept at 500° C. for 5 hours. The number of days required in the drying and the removal of the organic binder was 2 days. After the removal of the binder, the shaped article was rubber pressed under a pressure of 7 ton/cm², and then the resulting shaped article was fired. In the firing, the shaped article was heated up to 1,650° C. at a heating rate of 700° C./hr and then kept at 1,650° C. for about 1 hour under a nitrogen atmosphere to obtain a turbine wheel sintered article A having no defects on the surface and in the interior of the article. The number of days required in the above described whole treatment steps was 7 days.

Figure 4:
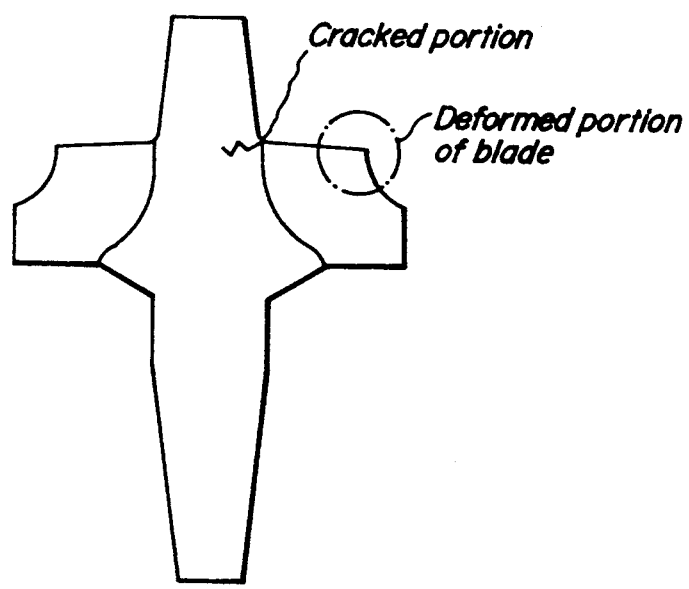
FIG. 4 is a view illustrating the defects in a turbine wheel sintered article.

Turbine wheel sintered articles were produced in the same manner as described above, except that the die temperature was varied from 25° C. to 83° C. The obtained results are shown in Table 1 and FIG. 4. In Table 1, the mark "x" under the heading of "Deformation of blade portion" means that the tip portion of the blade has been deformed by its own weight at the stage, wherein a shaped article was released from the die after the molding, to form a deformed portion in the blade as illustrated in FIG. 4, and the blade still maintained its deformed state after the sintering, and the turbine wheel sintered article had no commercial value. The mark "x" under the heading of "Formation of cracks" in Table 1 means that crazes, that is, cracks are formed on the surface of a green shaped article at the stage, wherein the shaped article has been released from the die, as illustrated in FIG. 4. Although the cracks were extinguished by the rubber press carried out after the removal of organic binder, the cracks were detected, even though the amount was very small, on the surface of the sintered article in the test carried out with respect to the sintered article according to the fluorescent penetration inspection method, and the turbine wheel sintered article was insufficient as a product. On the contrary, the mark "○" in Table 1 means that there are neither deformation of blade portion, nor formation of cracks, and the profile and dimension of the sintered article are agreed to the profile and dimension designed in the die, and there are no surface defects in the test according to the fluorescent penetration inspection method, and the resulting turbine wheel sintered article has a high dimensional accuracy and is excellent as a product. It can be seen from the results illustrated in Table 1 that it is preferable that the temperature of a die is set to a temperature near the thermal gelation and curing temperature of about 52° C. of methyl cellulose, that is, set to a temperature within the range of 42°–77° C. to thermally gelate and cure the batch.

TABLE 1

| Die temperatures (°C.) | Deformation of blade portion | Formation of cracks |
|---|---|---|
| 25 | x | ○ |
| 39 | x | ○ |
| 45 | ○ | ○ |
| 53 | ○ | ○ |
| 63 | ○ | ○ |
| 72 | ○ | ○ |
| 83 | ○ | x |

Figure 7:
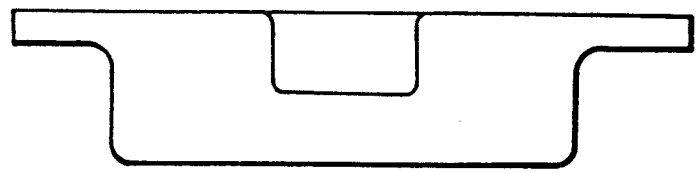
FIG. 7 is a cross-sectional view of a test piece shaped article having a complicated shape.

(2) Test piece shaped articles having a complicated shape:

Test piece shaped articles A, B, C and D having a diameter of 90 mm and having a complicated shape, which were illustrated in FIG. 7, were produced from the above prepared batches A, B, C and D, respectively, through an extrusion molding in the same manner as described in the above item (1).

The properties of the cross-section of each of the shaped articles were tested. The obtained results are illustrated in FIGS. 8A–8D. FIGS. 8A, 8B, 8C and 8D illustrates the cross-sections of shaped articles A, B, C and D, respectively. It can be seen from FIGS. 8A–8D that the use of ceramics powder having a particle size within the range defined by the equation (a) results in a shaped article having neither cracks 10 nor pores 11.

Comparative Example 1

Figure 5:
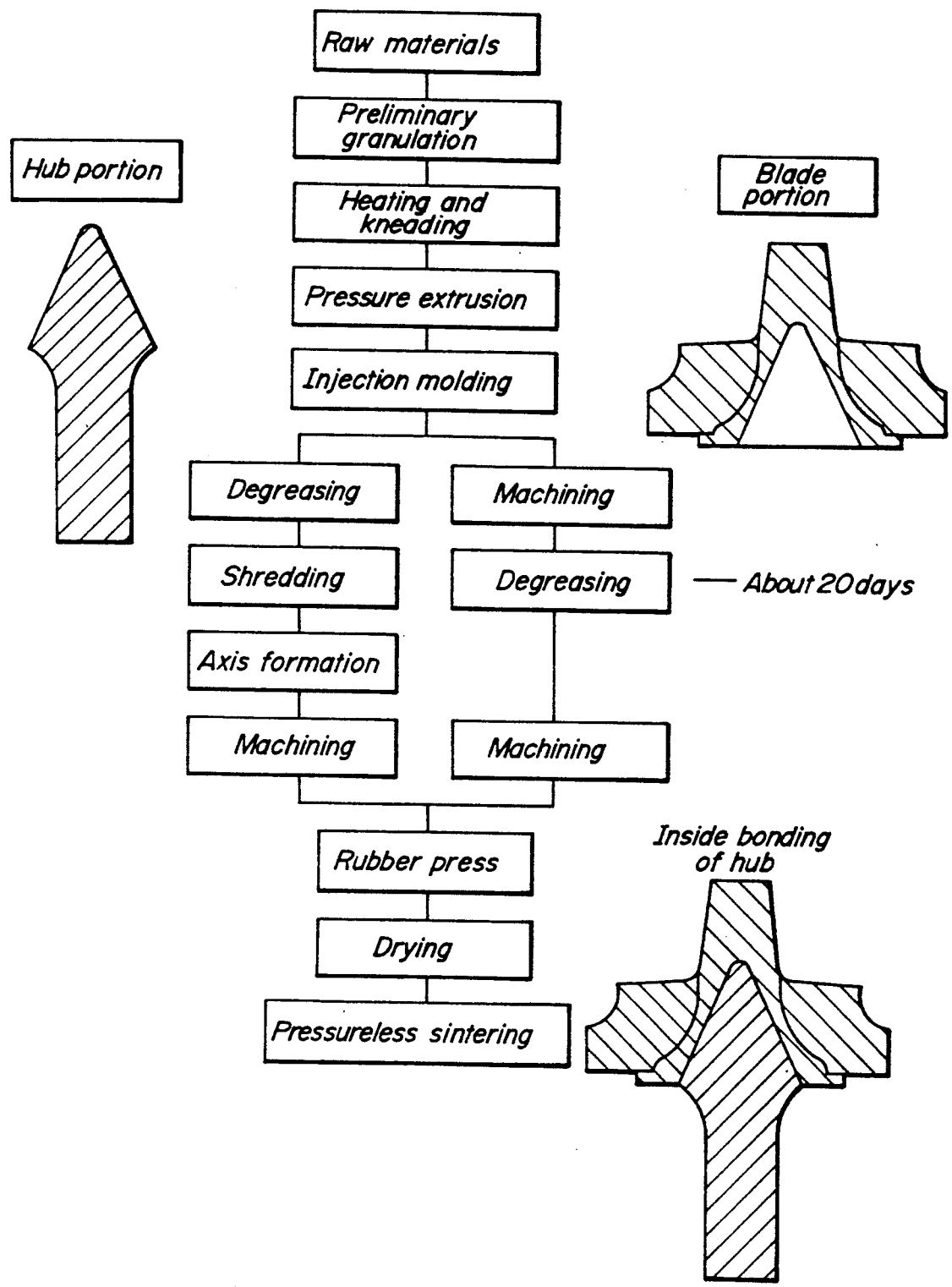
FIG. 5 shows a blocked flow sheet illustrating the production steps of a turbine wheel sintered article through a conventional injection molding and further shows the cross-sectional views of the hub portion and blade portion of the conventional turbine wheel sintered article.

The same turbine wheel sintered article as described in Example 1 was produced through a conventional injection molding followed by a sintering according to the blocked flow sheet illustrated in FIG. 5. In this case, it was possible to perform a monolithical molding, but a hub portion and a blade portion were separately produced through molding as illustrated in FIG. 5, and then they were monolithically bonded to each other by a rubber press as illustrated in FIG. 5. Moreover, although the same pulverized mixture as used in Example 1 was used, the degreasing of the blade portion had to be carried out at a heating rate of 0.5°–3.0° C./hr, and had to be carried out as long as 20 days, and the number of days required for carrying out the total steps illustrated in FIG. 5 was 60 days.

Figure 6:
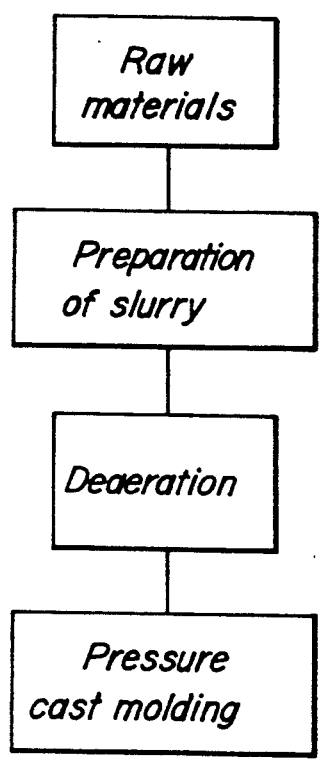
FIG. 6 is a blocked flow sheet illustrating a pressure cast molding system.

Further, the same turbine wheel shaped article as described above was produced according to the blocked flow sheet illustrated in FIG. 6 through a conventional pressure cast molding. In this case also, the same pulverized mixture as used in Example 1 was used and formed into a slurry containing 44% water and 1% deflocculant. After the slurry was deaerated, the slurry was subjected to a pressure cast molding. Although the pressure cast molding was effected by applying a pressure of 2 kg/cm² for 24 hours, a shaped article was not obtained.

EXAMPLE 2

Compression Molding

The above described batch A was stored for 24 hours in a refrigerator kept at 12° C., and then subjected to a compression molding.

Figure 9:
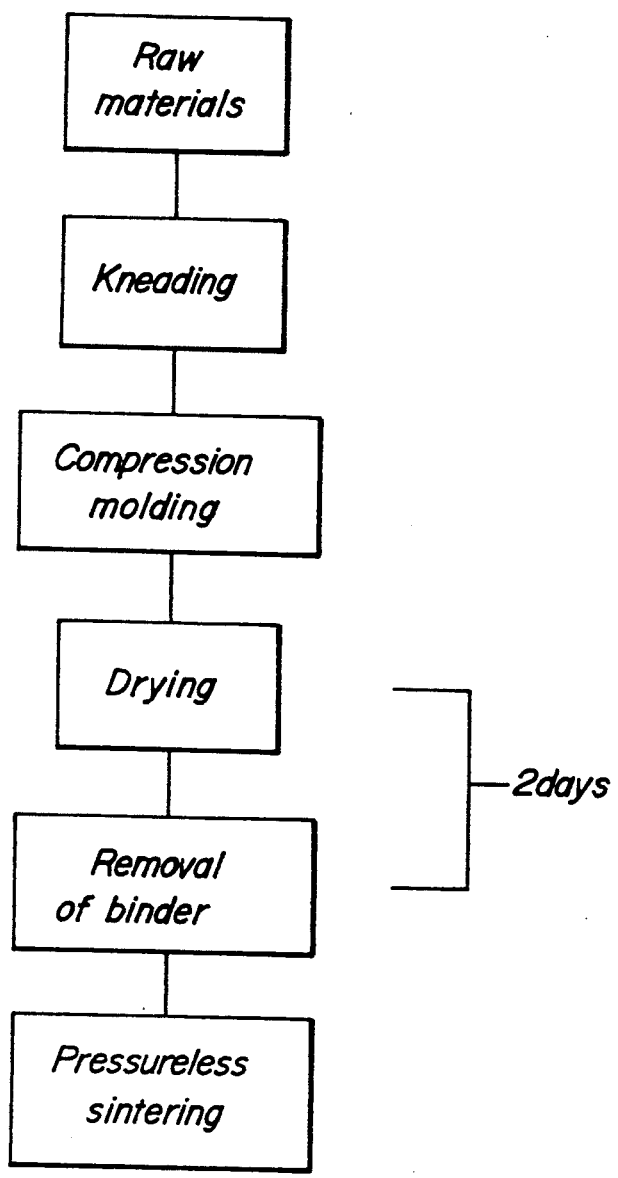
FIG. 9 is a blocked flow sheet illustrating the production steps of a ceramics sintered article of the present invention through a compression molding.
Figure 10:
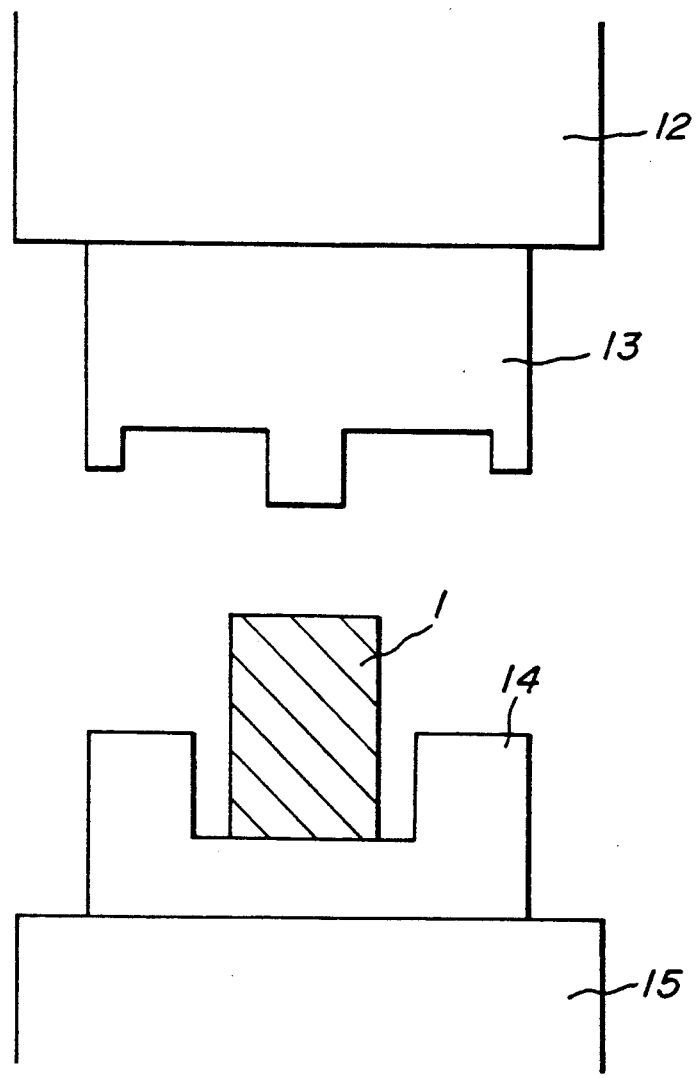
FIG. 10 is a diagrammatical cross-sectional view of a compression molding system.

A test piece sintered article having a diameter of 90 mm and having a complicated shape, which was illustrated in FIG. 7, was produced according to the blocked flow sheet illustrated in FIG. 9. An intermediate shaped article was produced through a compression molding by a molding system diagrammatically illustrated in FIG. 10. The die assembly used in this example had a Teflon coating formed on the inside of both the upper and lower dies 13 and 14 which coating had a thickness of 20 μm and had a contact angle with water of 105 degrees. The batch was molded under a condition that the batch temperature was 12° C., the die temperature was 60° C., and the pressure was 300 kg/cm². After the molding, the resulting mass was left to stand for 3 minutes in the die in order to thermally gelate and cure the batch.

After the compression molding, the resulting green shaped article was taken out from the die and then dried. In the drying, the green shaped article was kept at 60° C. for 2 hours in a constant temperature-constant humidity chamber kept at 60° C., then heated up to 100° C. at a heating rate of 10° C./hr, and then kept at 100° C. for 3 hours. The humidity in the constant temperature-constant humidity chamber was originally 98%, but the humidity was decreased at a rate of about 10%/hr and was finally decreased to 20%.

After the drying, the organic binder was removed. In the removal of the binder, the dried shaped article was heated in air up to 500° C. at a heating rate of 50° C./hr, and kept at 500° C. for 5 hours. The number of days required in the drying and the removal of the organic binder was 2 days. After the removal of the binder, the shaped article was rubber pressed under a pressure of 7 ton/cm², and then the resulting shaped article was fired. In the firing, the shaped article was heated up to 1,650° C. at a heating rate of 700° C./hr and then kept at 1,650° C. for about 1 hour under a nitrogen atmosphere to obtain a test piece sintered article having a complicated shape and having no defects on the surface and in the interior thereof. The number of days required in the above described whole treatment was 7 days.

EXAMPLE 3

Transfer Molding

The above described batch A was stored for 24 hours in a refrigerator kept at 12° C., and then subjected to a transfer molding.

Figure 11:
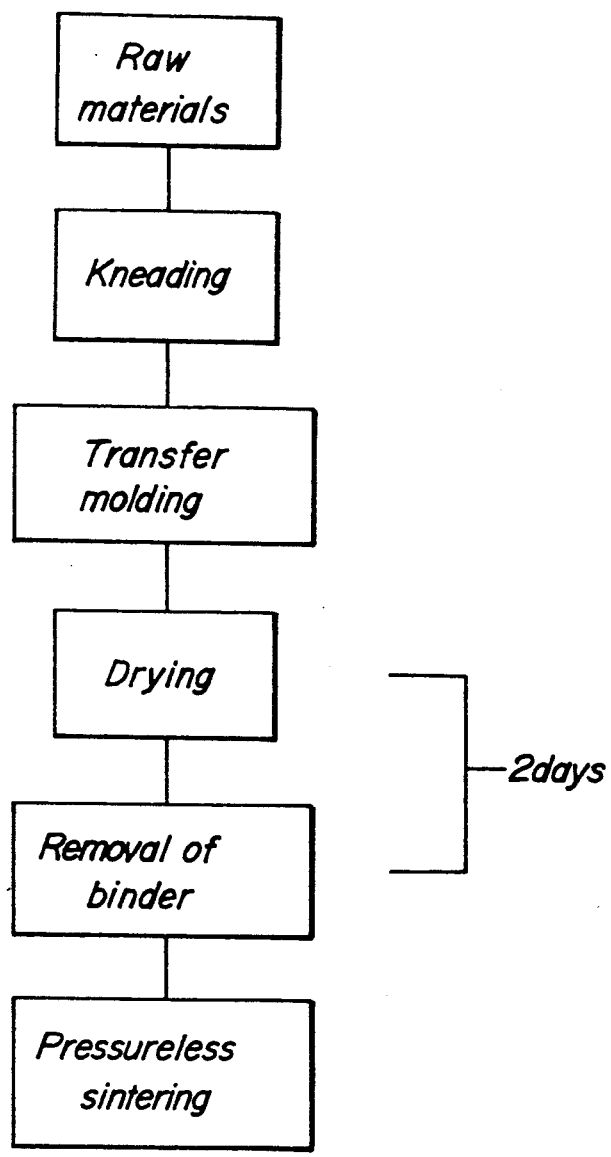
FIG. 11 is a blocked flow sheet illustrating the production steps of a ceramic sintered article of the present invention through a transfer molding.
Figure 12:
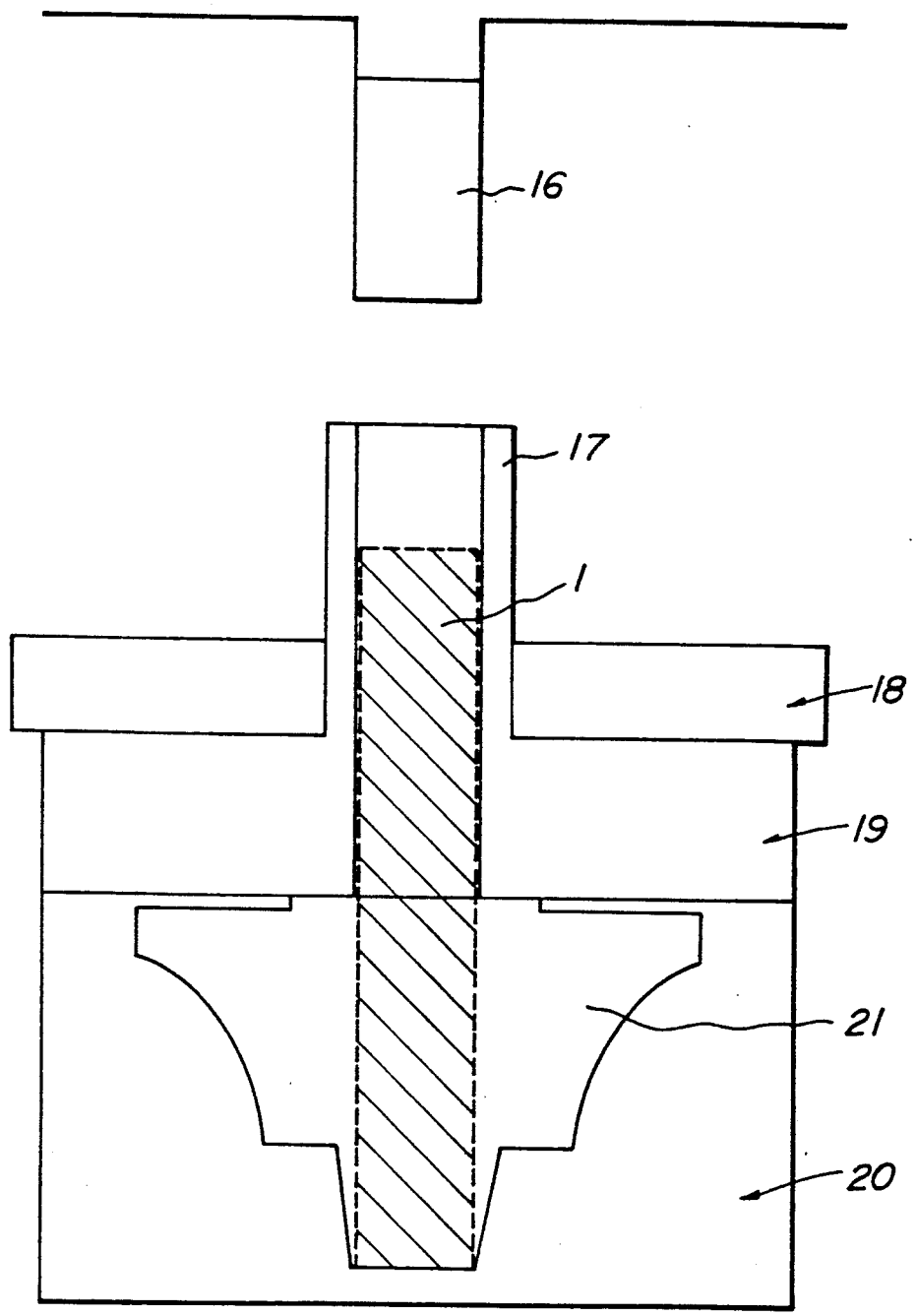
FIG. 12 is a diagrammatical cross-sectional view of the transfer molding system.

A turbine wheel sintered article illustrated in FIG. 2 and having a diameter of 130 mm was produced according to blocked flow sheet illustrated in FIG. 11. An intermediate shaped article was produced monolithically through a transfer molding according to a molding system illustrated diagrammatically in FIG. 12. The die assembly used in this example had a Teflon coating formed on the inside of both the upper and lower dies 19 and 20, which coating had a thickness of 20 μm and had a contact angle with water of 105 degrees. The batch was molded under a condition that the batch temperature was 12° C., the die temperature was 60° C., the pressure was 300 kg/cm², the pressing time was 10 seconds, and the downwardly moving speed of a piston was 300 cc/sec. After the molding, the resulting mass was left to stand for 3 minutes in the die in order to thermally gelate and cure the batch.

After the compression molding, the resulting green shaped article was taken out from the die and then dried. In the drying, the green shaped article was kept at 60° C. for 2 hours in a constant temperature-constant humidity chamber kept at 60° C., then heated up to 100° C. at a heating rate of 10° C./hr, and then kept at 100° C. for 3 hours. The humidity in the constant temperature-constant humidity chamber was originally 98%, but the humidity was decreased at a rate of about 10%/hr and was finally decreased to 20%.

After the drying, the organic binder was removed. In the removal of the binder, the dried shaped article was heated in air up to 500° C. at a heating rate of 50° C./hr, and kept at 500° C. for 5 hours. The number of days required in the drying and the removal of the organic binder was 2 days. After the removal of the binder, the shaped article was rubber pressed under a pressure of 7 ton/cm², and then the resulting shaped article was fired. In the firing, the shaped article was heated up to 1,650° C. at a heating rate of 700° C./hr and then kept at 1,650° C. for about 1 hour under a nitrogen atmosphere to obtain a turbine wheel sintered article having no defects on the surface and in the interior thereof. The number of days required in the above described whole treatment steps was 7 days.

EXAMPLE 4

To 100 parts by weight of SiC powders having an average particle size of 0.7 μm and containing a sintering aid were added 25 parts by weight of water, 5 parts by weight of a binder used as a molding aid and 1 part by weight of a dispersing agent, and the resulting mixture was kneaded in a pressure kneader. The resulting mixture was subjected to a vacuum kneading under a vacuum degree shown in Table 2 and then extruded to produce a batch having a dimension of 60 mmφ×100 mm length. The resulting batch 39 was poured into a batch-retaining portion 35 of a molding apparatus for turbine rotor (a blade diameter: 85 mmφ, and blade height: 30 mm) illustrated in FIG. 13, which molding apparatus comprised the above described batch-retaining portion 35 and a die assembly comprising impermeable dies 31 and 33 and an impermeable slide core 32, through an inlet 41 of the batch-retaining portion. Then a pressure piston 38 was moved downwardly, and the inlet 41 was tightly closed, and then a vacuum-deaeration of the batch-retaining portion 35 was effected through an exhaust port 37. Then, the batch 39 was poured into the die assembly through an inlet 36 (12 mmφ) under a pressure shown in Table 2, and after 20 seconds, the shaped article was released from the die to obtain a green shaped article shown in Table 2.

Figure 13:
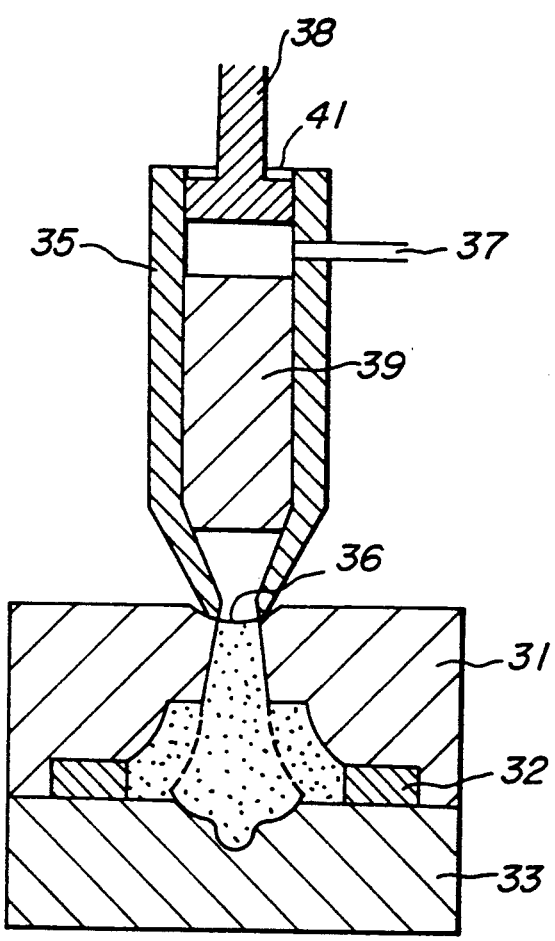

For comparison, a batch was produced by merely carrying out the kneading by means of the pressure kneader without carrying out the vacuum-kneading, and further a molding operation was effected with the use or without the use of the die assembly having no Teflon coating (polytetrafluoroethylene, contact angle θ: 108 degrees) formed on the surface of the shaped article cavity formed by the impermeable dies 31 and 33 and an impermeable slide core 32 as illustrated in FIG. 13, whereby a green shaped article shown in Table 2 was obtained.

The resulting green shaped article was heated up to 100° C. at a heating rate of 5° C./hr and was kept at 100° C. for 5 hours in a constant temperature-constant humidity chamber, whereby the shaped article was dried while decreasing gradually its humidity from 98%.

As seen from Table 2, when the molding method and the molding apparatus of the second aspect of the present invention are used, a good shaped article having a good mold release property and having neither apparent cracks nor cracks after drying can be obtained.

TABLE 2

|  | Vacuum kneading | Vacuum degree in vacuum kneading (cmHg) | Molding condition | | Green shaped article | | | Dried shaped article |
|  |  |  | Pressure (kg/cm²) | Teflon coating | Mold release property | Apparent cracks | Defects due to unfilled portion in die | Cracks after drying |
| --- | --- | --- | --- | --- | --- | --- | --- | --- |
| Sample No. 4-1 (this invention) | effected | 10 | 5 | effected | good | none | none*¹ | none |
| Sample No. 4-2 (this invention) | " | 40 | 10 | " | good | none | none | none |
| Sample No. 4-3 (this invention) | " | 70 | 100 | " | good | none | none | none |
| Sample No. 4-4 (this invention) | " | 75 | 200 | " | good | none | none | none |
| Comparative sample No. 4-1 | " | 0 | 50 | " | good | none | none | observed |
| Comparative sample No. 4-2 | " | 0 | 200 | not effected | poor | none | none | observed |
| Comparative sample No. 4-3 | not effected | — | 100 | effected | good | observed | none | observed |

*¹Very small defects due to unfilled portions in die are observed in 2 portions in the tip portion of blade.

EXAMPLE 5

Figure 14:
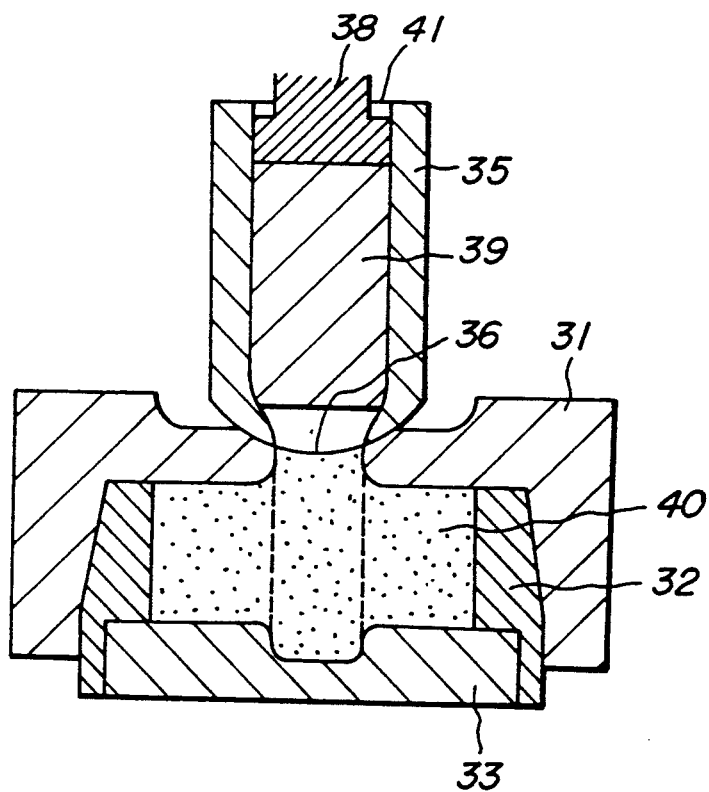

Si$_3$N$_4$ powders having an average particle size of 1 μm and containing a sintering aid were mixed with a molding aid and water according to the formulation shown in Table 3 and the resulting mixture was kneaded by means of a pressure kneader. The resulting homogeneous mixture was extruded into a batch having a shape of 60 mmφ×70 mm length by means of a vacuum kneading machine (vacuum degree: 75 cmHg). Separately, each of materials having different contact angles with water to each other was adhered to the surface of the blade portions 40 of a die cavity having a shape formed of 4 blades (blade diameter: 90 mmφ, blade height: 40 mm) as illustrated in FIG. 14. The above obtained batch 39 was poured into a die under a pressure of 500 kg/cm$^2$ through an inlet 36 (24 mmφ) and held therein for 10 seconds. Then, the thus treated batch was released from the die to obtain a green shaped article as shown in Table 3.

It can be seen from Table 3 that, when a material having a contact angle θ with water of at least 80 degrees is adhered to the surface of a die cavity corresponding to the shape of a shaped article, a good shaped article can be obtained. Further, the following fact is clear from Table 3. When it is intended to produce a turbine rotor or the like having a complicated shape, the mold release is more difficult. Therefore, it is necessary that a material having a contact angle θ with water of at least 90 degrees is used in order not to form even minute cracks.

Then, the shaped article was dried by decreasing gradually its humidity from 98% in a treatment in a constant temperature-constant humidity chamber, wherein the shaped article is heated up to 100° C. in a heating rate of 5° C./hr and kept at 100° C. for 5 hours. Then, the dried shaped article was degreased at 500° C. for 10 hours in a hot air-circulating electric furnace, and the degreased shaped article was packed in an ice bag, subjected to a rubber press molding under a pressure of 3 ton/cm$^2$, and then fired at 1,730° C. for 1 hour under an N$_2$ atmosphere to obtain sintered article.

ing aid were added 24 parts by weight of water, 3 parts by weight of a binder used as a molding aid and 0.5 part by weight of a dispersing agent, and the resulting mixture was kneaded by means of a pressure kneader. The homogeneous mixture was vacuum-kneaded under a vacuum degree of 76 cmHg and extruded into a batch having a dimension of 60 mmφ×300 mm length. Each of a test piece die (60 mmL×60 mmW×7 mmH) illustrated in FIG. 15, and a piston cavity die (outer diameter: 100 mmφ, a height: 25 mm) illustrated in FIG. 16 and a turbine rotor die (blade diameter: 75 mmφ, blade height: 35 mm) was set in a molding apparatus, the above obtained batch 39 was poured into a batch-retaining portion 35 through the inlet 41 of the batch-retaining portion 35, a pressure piston 38 was moved downwardly, the inlet 41 of the batch-retaining portion was tightly closed, and then a vacuum deaeration of the batch-retaining portion 35 was effected through an exhaust port 37. Then, the deaerated batch was poured under pressure into a die through an inlet 36 of the die under a molding condition shown in Table 4 and molded therein for 15 seconds under a molding condition shown in Table 4, and the resulting mass was released from the die to obtain a green shaped article shown in Table 4.

The surface of the impermeable dies 31 and 33 and the surface of the impermeable slide core 32 had been coated with Teflon (polytetrafluoroethylene, contact angle θ with water: 90 degrees).

It can be seen from Table 4 that the use of the molding method and molding apparatus of the second aspect of the present invention can result in an excellent shaped article having good mold release property and having no apparent cracks.

Further, it can be seen from Table 4 that when a permeable die is merely arranged in that portion of a die which is poor in air permeability or when a die is vacuum-deaerated through a permeable die, a shaped article having more excellent appearance can be obtained.

Further, it can be seen from Table 4 that when the ratio of the pouring speed under pressure to the specific surface area of the shaped article is at least 0.7, a shaped

TABLE 3

| | Formulation (parts by weight) | | | | Material adhered to the blade portion of die cavity | | Green shaped article | |
|---|---|---|---|---|---|---|---|---|
| | Si$_3$N$_4$ | Binder | Ether-type nonionic surfactant | Water | Kind | Contact angle θ with water (degree) | Mold release property | Apparent cracks |
| Sample No. 5-1 (this invention) | 100 | 0.5 | 1 | 20 | polyvinyl fluoride | 80 | good*$^1$ | none |
| Sample No. 5-2 (this invention) | 100 | 3 | 1 | 25 | polyethylene | 94 | good | none |
| Sample No. 5-3 (this invention) | 100 | 5 | 1 | 25 | tetrafluoroethylene-perfluoroalkyl vinyl ether copolymer | 107 | good | none |
| Sample No. 5-4 (this invention) | 100 | 10 | 1 | 30 | polyvinyl chloride | 87 | good*$^2$ | none |
| Sample No. 5-4 (this invention) | 100 | 15 | 1 | 30 | polytrifluorochloroethylene | 90 | good | none |
| Comparative sample No. 5-1 | 100 | 20 | 1 | 30 | nylon | 70 | poor | observed |
| Comparative sample No. 5-2 | 100 | 5 | 1 | 25 | none (Fe) | 0 | good | observed |

*$^1$Very small cracks are observed in two portions in the tip portion of blade.
*$^2$Very small cracks are observed in one portion in the tip portion of blade.

EXAMPLE 6

To 100 parts by weight of Si$_3$N$_4$ powders having an average particle size of 0.8 μm and containing a sinterarticle having neither apparent cracks nor creases can be obtained.

TABLE 4(a)

| | Permeable die | | Vacuum deaeration from permeable die | | Pouring speed (cm³/sec) | Surface area of shaped article (cm²) | Ratio of (Pouring speed)/(Surface area of shaped article) | Pressure (kg/cm²) |
|---|---|---|---|---|---|---|---|---|
| | Used | Not used | Effected | Not effected | | | | |
| Sample No. 6-1 (this invention) | ○ | | | ○ | 100 | 89 | 1.1 | 100 |
| Sample No. 6-2 (this invention) | ○ | | | ○ | 300 | " | 3.4 | 100 |
| Sample No. 6-3 (this invention) | ○ | | | ○ | 500 | " | 5.6 | 100 |
| Sample No. 6-4 (this invention) | ○ | | | ○ | 300 | " | 3.4 | 100 |
| Sample No. 6-5 (this invention) | ○ | | | ○ | 100 | 202 | 0.5 | 150 |
| Sample No. 6-6 (this invention) | ○ | | | ○ | 150 | " | 0.7 | 150 |
| Sample No. 6-7 (this invention) | ○ | | | ○ | 200 | " | 1.0 | 100 |
| Sample No. 6-8 (this invention) | ○ | | | ○ | 300 | " | 1.5 | 200 |
| Sample No. 6-9 (this invention) | ○ | | | ○ | 200 | " | 1.0 | 100 |
| Sample No. 6-10 (this invention) | ○ | | | ○ | 200 | 264 | 0.8 | 200 |
| Sample No. 6-11 (this invention) | ○ | | | ○ | 300 | " | 1.1 | 100 |
| Sample No. 6-12 (this invention) | | ○ | | ○ | 300 | " | 1.1 | 200 |
| Sample No. 6-13 (this invention) | | ○ | ○ | | 300 | " | 1.1 | 200 |
| Sample No. 6-14 (this invention) | ○ | | | ○ | 100 | " | 0.4 | 200 |
| Sample No. 6-15 (this invention) | | ○ | | ○ | 150 | " | 0.6 | 200 |

TABLE 4(b)

| | Number of continuously repeated moldings | Green shaped article | | | Die used |
|---|---|---|---|---|---|
| | | Mold release property | Apparent cracks | Creases | |
| Sample No. 6-1 (this invention) | 1 | good | none | none | test piece |
| Sample No. 6-2 (this invention) | 1 | " | " | " | " |
| Sample No. 6-3 (this invention) | 1 | " | " | " | " |
| Sample No. 6-4 (this invention) | 6 | " | " | " | " |
| Sample No. 6-5 (this invention) | 1 | " | " | very small amount | turbine rotor |
| Sample No. 6-6 (this invention) | 1 | " | " | none | " |
| Sample No. 6-7 (this invention) | 1 | " | " | " | " |
| Sample No. 6-8 (this invention) | 1 | " | " | " | " |
| Sample No. 6-9 (this invention) | 3 | " | " | " | " |
| Sample No. 6-10 (this invention) | 1 | " | " | " | piston cavity |
| Sample No. 6-11 (this invention) | 1 | " | " | " | " |
| Sample No. 6-12 (this invention) | 1 | " | " | " | " |
| Sample No. 6-13 (this invention) | 1 | " | " | " | " |
| Sample No. 6-14 (this invention) | 1 | " | " | very small amount | " |
| Sample No. 6-15 (this invention) | 1 | " | " | " | " |

*Only one linear crack was observed (Sample No. 6-11)

As described above, according to the present invention, water is predominantly used as a plasticizing medium and a small amount of an organic binder is used, whereby a shaped article having a large thickness and a complicated shape, which is difficult to be produced monolithically through a conventional injection molding, can be produced monolithically through an injection molding, and further the organic binder can be removed in a short period of time. Therefore, ceramic sintered articles having complicated shapes can be easily obtained. Therefore, a sintered article can be produced in a remarkably shortened period of time, and the present invention is very valuable in industry. Moreover, in the present invention, as an organic binder, a water-soluble or water-absorbing polymer, preferably, a water-soluble or water-absorbing polymer capable of being thermally gelated and cured, for example, methyl cellulose, is used, and hence the binder can be gelated and cured in a die, and a shaped article having a high shape retention can be obtained with a high moldability by an injection molding. Accordingly, when the shaped article is dried, and after the removal of the organic binder, the shaped article is fired, a ceramic sintered article having a high dimensional accuracy can be obtained in a high yield.

Moreover, in the present invention, water is predominantly used as a plasticizing medium and a small amount of organic binder is used as described above, and hence large-size structural parts having a complicated shape and a large thickness, which cannot be produced through a conventional compression molding or transfer molding, can be produced through compression molding or transfer molding. Further, when the shaped articles are dried and, after the removal of binder, the shaped article is fired, ceramic sintered articles can be produced in high accuracy and yield.

Further, according to the molding method and molding apparatus in the second and third aspects of the present invention, an excellent shaped articles having a good mold release property and having neither apparent cracks nor deformation can be obtained in a short molding time without causing leakages during the molding.

What is claimed is:

1. A method of producing ceramic articles sequentially comprising the steps of:
   (a) injection molding a kneaded material containing ceramic powder, sintering aids, water and organic binder to provide a molded body, said ceramic powder having a particle size within a range defined by the following formula:

$$\frac{\text{average particle diameter measured by particle size distribution}}{\text{specific surface area particle diameter measured by adsorption method}} \leq 5$$

(b) drying the molded body;
   (c) isostatically pressing the entire dried, molded body under hydrostatic pressure;
   (d) removing the organic binder from the molded body; and
   (e) sintering the molded body.

2. The method of claim 1, wherein the ceramic powder comprises at least one component selected from the group consisting of silicon carbide, silicon nitride, sialon, boron nitride, and zirconia.

3. The method of claim 1, wherein the sintering aids are used in the form of particles similar to that of the ceramic powder.

4. The method of claim 1, wherein the water is added to the ceramic powder as a plasticizer in an amount of 10–50 parts by weight to 100 parts by weight of ceramic powder.

5. The method of claim 1, wherein the organic binder comprises a water soluble or water absorbable organic compound selected from the group consisting of methyl cellulose, hydroxy propyl methyl cellulose or other water soluble cellulose ether derivatives; polyvinyl alcohol, polyethylene glycol or other water absorbable high polymers.

6. The method of claim 1, wherein the organic binder has thermo-gelling and setting properties, and is selected from the group consisting of methyl cellulose, hydroxy propyl methyl cellulose, and alkylene oxide cellulose derivatives.

7. The method of claim 1, wherein the organic binder is contained in the kneaded material in an amount of 0.1–15 parts by weight to 100 parts by weight of ceramic powder.

8. The method of claim 1, wherein the ceramic powder is previously mixed with the sintering aids and the mixture of the ceramic powder and sintering aids is ground to provide a ground mixture.

9. The method of claim 8, wherein the ground mixture is dried by a spray dryer.

10. The method of claim 1, wherein the hydrostatic pressure is about $1 \sim 10$ ton/cm$^2$.

11. The method of claim 1, wherein the hydrostatic pressure is about $2.5 \sim 8$ ton/cm$^2$.

12. The method of claim 1, wherein the sintering aids comprise rare earth oxides.

13. The method of claim 1, wherein the sintering aids comprise at least one component selected from the group consisting of magnesia, beryllia, cerium oxide, strontium oxide, titania, zirconia and yttria.

14. The method of claim 1, wherein the sintering aids comprise at least one composite oxide selected from the group consisting of beryllium titanate and zirconia titanate.

15. The method of claim 1, wherein the sintering aids comprise at least one multi-compositional oxide selected from the group consisting of mullite and aluminum zircon.

16. A method for producing a ceramic sintered article, comprising the steps of:
    providing a ceramic powder having a particle size satisfying the following equation:

$$\frac{\text{average particle diameter calculated from the particle size distribtuion}}{\text{specific surface area particle size calculated by the adsorption method}} \leq 5$$

forming a mixture of said ceramic powder with a sintering aid, water and an organic binder;
    deaerating the mixture by means of a vacuum kneading machine to produce a ceramic batch;
    injection molding the ceramic batch into an injection molding die to form a green shaped article;
    removing the water and organic binder from the green shaped article; and
    firing the shaped article to form said ceramic sintered article.

17. The method of claim 16, further comprising the step of heating the injection molding die within a temperature range defied by T-10° C.$\leq$T$\leq$T+25° C., wherein T is the thermal gelation and curing temperature of the organic binder contained in the ceramic batch, to thermally elate and cure the organic binder and thus maintain the molded shape of the green shaped article.

* * * * *